US006223534B1

(12) United States Patent
Erdmann et al.

(10) Patent No.: US 6,223,534 B1
(45) Date of Patent: May 1, 2001

(54) ENGINE-BRAKING ARRANGEMENT FOR AN INTERNAL COMBUSTION ENGINE WITH AN EXHAUST-GAS TURBOCHARGER

(75) Inventors: Wolfgang Erdmann; Carsten Funke, both of Stuttgart; Jürgen Lenz, Schorndorf; Paul Löffler, Stuttgart; Erwin Schmidt, Baltmannsweiler; Siegfried Sumser, Stuttgart, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/370,194

(22) Filed: Aug. 9, 1999

(30) Foreign Application Priority Data

Aug. 13, 1998 (DE) .............................. 198 36 677

(51) Int. Cl.[7] ................................... F02D 23/00
(52) U.S. Cl. ...................... 60/602; 123/564; 415/157; 415/150; 415/151; 415/167
(58) Field of Search .................. 60/602; 123/564; 415/150, 151, 157, 167

(56) References Cited

U.S. PATENT DOCUMENTS

| 3,557,549 | * | 1/1971 | Webster | 60/602 |
|---|---|---|---|---|
| 4,224,794 | * | 9/1980 | Woollenweber | 60/602 |
| 4,395,884 | | 8/1983 | Price | 60/602 |
| 4,474,006 | * | 10/1984 | Price et al. | 60/602 |
| 5,117,790 | | 6/1992 | Clarke et al. | 123/321 |
| 5,410,882 | | 5/1995 | Davies et al. | 60/602 |
| 5,437,156 | | 8/1995 | Custer | 60/611 |
| 5,634,447 | | 6/1997 | Rowells | 123/322 |
| 5,647,318 | * | 7/1997 | Feucht et al. | 60/602 |
| 5,813,231 | | 9/1998 | Faletti et al. | 60/602 |
| 5,839,281 | | 11/1998 | Sumser et al. | 60/602 |
| 5,867,987 | | 2/1999 | Halimi et al. | 60/602 |

FOREIGN PATENT DOCUMENTS

| 1 576 282 | 3/1970 | (DE) . |
|---|---|---|
| 36 06 944 | 9/1987 | (DE) . |
| 38 83 832 | 3/1990 | (DE) . |
| 195 16 926 | 11/1996 | (DE) . |
| 195 40 060 | 4/1997 | (DE) . |
| 195 43 290 | 5/1997 | (DE) . |
| 197 17 094 | 6/1998 | (DE) . |
| 2 215 817 | 9/1989 | (GB) . |
| 2 307 718 | 6/1997 | (GB) . |

* cited by examiner

Primary Examiner—Thomas Denion
Assistant Examiner—Thai-Ba Trieu
(74) Attorney, Agent, or Firm—Klaus J. Bach

(57) ABSTRACT

In an engine braking arrangement for an internal combustion engine with an exhaust gas turbocharger including a turbine arranged in the engine exhaust duct and a compressor driven by the turbine and arranged in the engine intake duct, a brake valve disposed in the exhaust duct upstream of the turbine and a pressure relief line extending from the exhaust duct upstream of the turbine rotor to an area downstream of the turbine and including a stop valve, the stop valve is a rotationally adjustable rotary valve operable by an actuating device depending on the intake pressure in the intake duct.

18 Claims, 3 Drawing Sheets

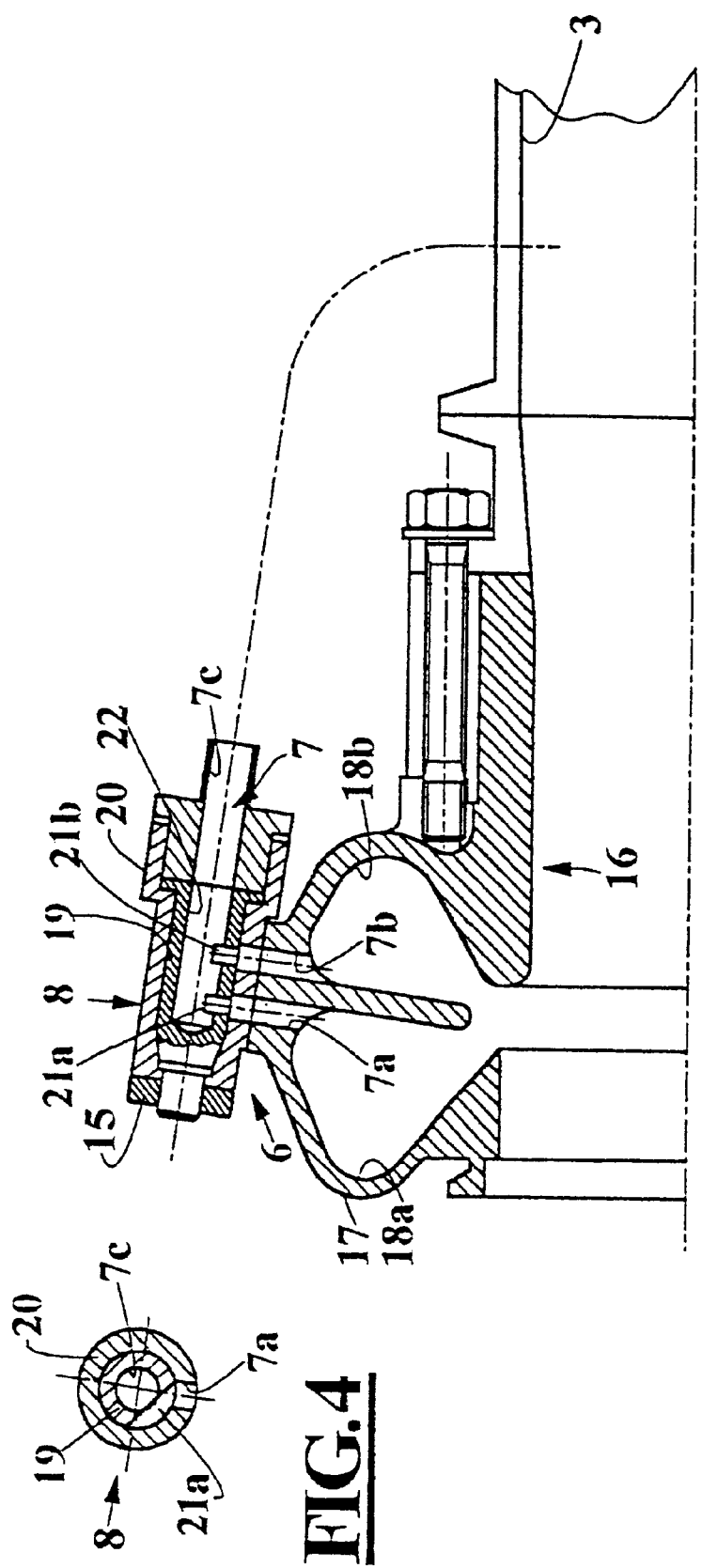

ENGINE-BRAKING ARRANGEMENT FOR AN INTERNAL COMBUSTION ENGINE WITH AN EXHAUST-GAS TURBOCHARGER

BACKGROUND OF THE INVENTION

The invention relates to an engine-braking arrangement for an internal combustion engine with an exhaust-gas turbocharger including a brake valve in the exhaust pipe upstream of the turbine and a pressure relief line, which is connected to the turbine upstream of the turbine rotor and includes a control valve.

DE 195 40 060 A1 discloses a multi-cylinder internal combustion engine, in the exhaust tract of which is arranged a turbine of an exhaust-gas turbocharger, the said turbine driving, via a shaft, a compressor which generates an increased intake pressure in the intake duct. In order to achieve a high engine-braking action in the coasting mode of a vehicle, in which the engine is installed, a brake valve in the exhaust line is closed during braking, with the result that excess pressure is built up in the exhaust line upstream of the brake valve. The built-up exhaust gas flows at high velocity through a bypass directly into a spiral duct of the turbine and acts on the turbine rotor, whereupon the compressor builds up excess pressure in the intake duct. The cylinder is thereby subjected to an increased charging pressure at the entry side. On the exit side, an excess pressure develops between the cylinder outlet and the brake valve and counteracts the discharge of the air compressed in the cylinder into the exhaust tract via the exhaust valves. During braking, the piston must, in the compression stroke, perform compression work against the high excess pressure in the exhaust tract, with the result that a strong braking action is achieved.

In order to prevent an unacceptably high load caused by an excessive build-up pressure upstream of the rake valve during braking, the engine-braking device of DE 195 40 060 A1 has a discharge arrangement consisting of a relief line with a stop valve. When a pressure limit value is reached, the stop valve is opened, so that backed-up exhaust gas is discharged via the relief line and the back-up pressure is reduced.

To control the high pressure upstream of the brake valve, the exhaust-gas quantity to be discharged via the discharge arrangement must finely adjustable, since even slight pressure drops in the line section upstream of the brake valve lead to a drastic reduction in engine-braking capacity. For this reason, stringent requirements must be met as regards an accurate setting of small cross sections of the stop valve in the relief line. In particular, exhaust-gas pulsations caused by pressure fluctuations in the engine, which generate disturbing forces acting on the stop valve, should not impair the blow-off operation.

It is the object of the present invention to provide an engine-braking device with a reliably operating blow-off arrangement, by means of which overloading of the internal combustion engine during large braking loads is prevented.

SUMMARY OF THE INVENTION

In an engine braking arrangement for an internal combustion engine with an exhaust gas turbocharger including a turbine arranged in the engine exhaust duct and a compressor driven by the turbine and arranged in the engine intake duct, a brake valve disposed in the exhaust duct upstream of the turbine and a pressure relief line extending from the exhaust duct upstream of the turbine rotor to an area downstream of the turbine and including a stop valve, the stop valve is a rotationally adjustable rotary valve operable by an actuating device depending on the intake pressure in the intake duct.

Since the stop valve is a rotary valve, it remains unaffected by the exhaust-gas pulsations in the exhaust tract. The exhaust-gas stream to be blown off can be controlled accurately so that the desired pressure limit value can be maintained with a high degree of accuracy and, at the same time, there are no significant losses of braking capacity due to the discharge of the exhaust gas. Even the smallest discharge cross-sections can be controlled by an appropriate rotational control movement of the rotary valve.

The actuating device acting upon the rotary valve utilizes as setting criterion and/or as control value the intake pressure in the intake duct, which prevails at the cylinders at the engine intake side.

When the intake pressure reaches a predetermined limit value, the stop valve is opened and the exhaust gas is blown off via the relief line, whereupon the exhaustgas back pressure drops, the turbine power is reduced and, consequently, the intake pressure is also lowered to a subcritical value. The blow-off of exhaust gas eliminates the energy of the latter and reliably avoids component overloading. The intake pressure may be utilized either as an actuating signal for the actuating device acting upon the stop valve, the actuating signal being converted into a physical control value adapted to the type of actuating device. The actuating signal may also be supplied directly as a physical control value to a pneumatically operable actuating device, by which the rotary valve can be controlled.

The positions of the brake valve and the stop valve may be set independently of one another, so that, during braking with the brake valve closed, the exhaustgas back-pressure can be manipulated, without the brake-valve position being affected. For this purpose, in a first embodiment, the relief line bridges the brake valve, so that, with the stop valve opened, the exhaust-gas line section upstream of the brake valve communicates with the exhaust-gas line section downstream of the latter. The exhaust-gas back-pressure is lowered and the pistons in the cylinders have to perform less work against the pressure in the exhaust duct.

The brake valve is advantageously bridged by the integration of the relief line into the brake valve, in particular into a shaft of the brake valve which is designed as a rotary valve, with the result that a particularly space-saving design can be implemented. In this case, the axis of rotation of the rotary valve disposed in the shaft is preferably orthogonal to the axis of rotation of the brake valve. The rotational movements of the brake valve and of the rotary slide may be executed independently of one another.

According to a another embodiment, the relief line is an independent line which runs outside the exhaust line and can branch off from the latter both upstream and downstream of the brake valve.

If the relief line branches off upstream of the brake valve, it is connected to the exhaust line again downstream of the brake valve, either upstream or downstream of the turbine. In the first instance, only the brake valve is bridged and pressure equalisation is provided between the line sections on both sides of the brake valve. As a result the high exhaust-gas flow velocities of the exhaust-gas stream guided through the by-pass are reduced and the turbine power is lowered correspondingly. In the second instance, the exhaust-gas is discharged directly outwards through the relief line, by-passing the turbine, and exhaust-gas energy is lost.

If the relief line branches off downstream of the brake valve, particularly directly from the spiral inlet duct of the turbine casing, the pressure acting on the turbine, and correspondingly the turbine power, is lowered.

The rotary valve advantageously has a hollow-cylindrical rotary body with radial flow orifices which, depending on the position of the rotary body, communicate with the exhaust line for the discharge of exhaust gas. The flow orifices may be designed as flow grooves, which extend over a portion of the circumference, in particular over an angle of 90° to 180°. Depending on the rotary position of the rotary valve a section of greater or lesser length of the flow grooves comes into contact with the exhaust line providing for continuously adjustable intermediate positions between the closing position and the maximum opening position being obtainable. The exhaust gas can be discharged into the relief line via an axial flow orifice in the rotary body.

The actuating device of the rotary valve is preferably designed as a pneumatic pressure bellows, to which the intake pressure of the intake duct can be supplied as a control value.

Further advantages and embodiments of the invention will become apparent from the following description on the basis of the accompanying drawings:

BRIEF DESCRIPTION OF THE DRAWINGS

FIG. 3 shows a third embodiment of an exhaust gas discharge arrangement, FIG. 4 is a cross-sectional view of the stop valve of the discharge arrangement of FIG. 3.

DESCRIPTION OF PREFERRED EMBODIMENTS

Figure 1:
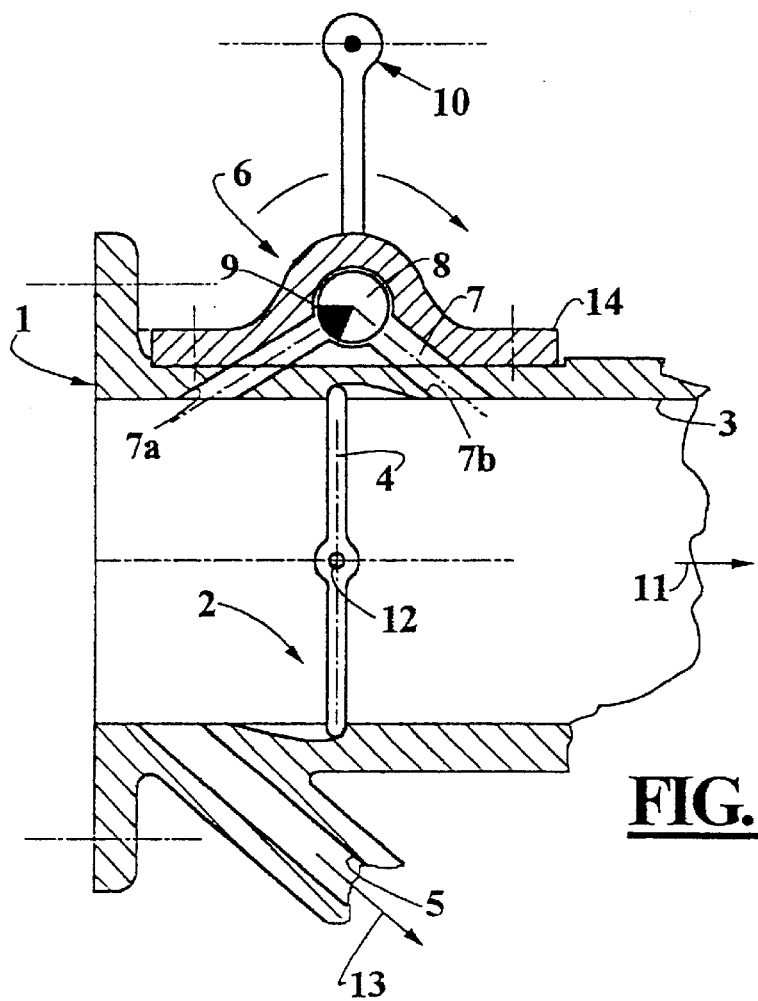
FIG. 1 is a sectional view of an exhaust duct of an internal combustion engine with an exhaust gas discharge arrangement.

FIG. 1 shows an exhaust duct portion 1 of an internal combustion engine, in particular of an internal combustion engine of a commercial vehicle, which comprises an exhaust line 3, via which exhaust gases from the cylinders of the internal combustion engine are supplied, in the direction of arrow 11, first to a turbine of an exhaust-gas turbocharger and then to an exhaust-gas purification device. Included in the exhaust line 3 upstream of the turbine of the exhaust-gas turbocharger is an engine-braking arrangement 2, which comprises a brake valve 4 and a bypass 5. The bypass 5 branches off the exhaust line 3 directly upstream of the brake valve 4 and exhaust gas can also be supplied to the turbine via the bypass 5 in the direction of the arrow 13. The flow cross-section of the bypass 5 is significantly smaller than the flow cross-section of the exhaust line 3.

The brake valve 4 is designed as a rotary valve and is mounted on a shaft 12, which is rotatably supported. The brake valve 4 can be adjusted between an opening position freeing the flow cross-section of the exhaust line 12 and a blocking position closing the flow cross-section. In the blocking position the exhaust line 3 is sealed off, so that no exhaust gas can pass through the exhaust line 3 to the turbine in the direction of the arrow 11. When the internal combustion engine is in the traction mode, the brake valve 4 is in the opening position, and in the engine-braking mode the latter is in the blocking position. In the engine-braking mode, a high exhaust-gas back-pressure builds up in the section of the exhaust line 3 between the cylinder outlet and the closed brake valve 4. The exhaust gas is directed via the bypass 5 to the parallel flow path of the turbine and impinges at high flow velocity onto the turbine rotor, with the result that the compressor of the exhaust-gas turbocharger is driven to a higher speed and the intake pressure in the intake tract is increased. If appropriate, the flow velocity of the exhaust gas impinging onto the turbine rotor may be increased, using a nozzle directly adjacent the turbine rotor. The braking action is achieved in that the piston in the cylinder has to perform compression work against to the high exhaust-gas back-pressure.

In order to avoid overloading in the enginebraking mode, the exhaust-gas back-pressure can be controlled, upstream of the brake valve 4, by means of a discharge arrangement 6. The discharge arrangement 6 includes a relief line 7 and a stop or rotary valve 8 which is continuously adjustable between a blocking position and an opening position by an actuating device 10. The relief line 7 comprises a first and a second line section 7a, 7b (FIG. 3), the first line section 7a branching off the exhaust line 3 directly upstream of the brake valve 4 on the side located opposite the bypass 5. The second line section 7b leads to the exhaust line 3 again directly downstream of the brake valve 4, the stop valve 8 being arranged between the two line sections 7a, 7b in a flange 14. The axes of rotation of the stop valve 8 and of the brake valve 4 are parallel to one another.

The intake pressure in the intake duct of the internal combustion engine or else the exhaust-gas back-pressure may be utilized as a criterion for opening the stop valve 8. When the intake pressure or the exhaust-gas back-pressure exceeds a pressure limit value, the stop valve is opened as wide and for as long as is necessary to return the pressure to the permitted range. The current pressure value and the pressure limit value can be compared with one another in an engine control unit; if the pressure value is unacceptably high, the engine control unit generates an actuating signal for controlling the actuating device 10.

The actuating device 10 may also be controlled directly by the intake pressure. For this purpose, the actuating device 10 is, for example, a pneumatic actuator, in particular a pressure bellows, to which the intake pressure is supplied via a pressure connecting line. The pressure bellows is pre-stressed via a spring according to the pressure limit value to be set. The pressure bellows executes an actuating movement opening the stop valve 8 as soon as the pressure exceeds the limit value.

In another embodiment, the actuating device 10 is an electric motor or a hydraulic actuating element, which can be operated by an actuating signal from the engine control system.

Figure 2:
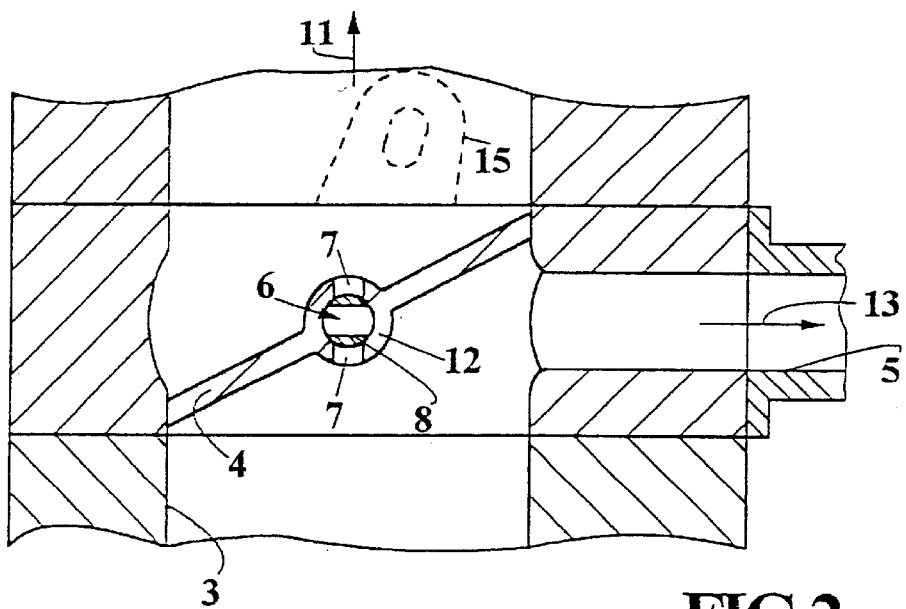
FIG. 2 shows another embodiment of an exhaust gas discharge arrangement.

According to FIG. 2, in a embodiment similar to that of FIG. 1, the brake valve 4 is arranged in the exhaust line 3. When the brake valve 4 is in the opening position, the exhaust gas flows through the exhaust line 3 to the spiral turbine inlet path in the flow direction of the arrow 11 and, in the closed position of the valve 4, through the bypass line 5 to the secondary flow path of the turbine in the direction of the arrow 13.

In a space-saving arrangement, the discharge arrangement 6 is integrated into the brake valve 4. The brake valve 4 is a rotary valve and includes a rotatable shaft 12. The shaft 12 includes a passage which extends in the longitudinal direction of the shaft 12 and which bridges the brake valve 4 and forms a relief line 7. Moreover, the shaft 12 has arranged in it the stop valve 8, the axis of rotation of which is orthogonal to the shaft axis of the brake valve 4. When the stop valve is in the open position, it permits gas flow through the passage in the shaft 12 for the relief of pressure. In the blocking position, the passage is closed. The stop valve 8 can be rotated between the open position and the closed position by an actuating lever 15 operated by the actuating device, not shown.

In the exemplary embodiment shown in FIGS. 3 and 4, the relief line 7 of the blow-off arrangement 6 communicates with the turbine inlet flow path 17 of the turbine 16 and extends to the exhaust line 3. When the stop valve 8 is in the open position, the relief line conducts exhaust gas out of the turbine flow path 17 into a line section of the exhaust line 3 located downstream of the turbine 16. The turbine flow path 17 is of double-flow path design, with a first flow path 18a and a second flow path 18b. A line section 7a, 7b of the relief line 7 branches off from each flow path 18a, 18b, and both line sections 7a, 7b extend to the stop valve 8 which controls communication with the line sections 7a, 7b. In the open position, the exhaust gas flows through a third line section 7c out of the stop valve 8 into the exhaust line 3 downstream of the turbine 16.

The stop valve 8 consists of a hollow-cylindrical rotary body 19 which is received rotatably in a fixed receiving sleeve 20 and which can be rotated by the actuating lever 15 between an open valve position and a flow blocking position. The hollow-cylindrical rotary body 19 has two radial flow orifices 21a, 21b which provide for communication with the line sections 7a, 7b when the stop valve 8 is open. The rotary body 19 is connected to the third line section 7c via an axial flow orifice 22. The flow orifices 21a, 21b are in the form of flow slots, which are cut circumferentially into the rotary body.

Figure 5:
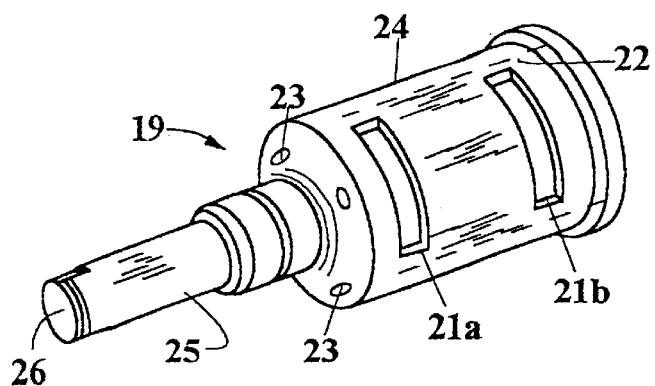
FIG. 5 is a perspective view of a stop valve.
Figure 6:
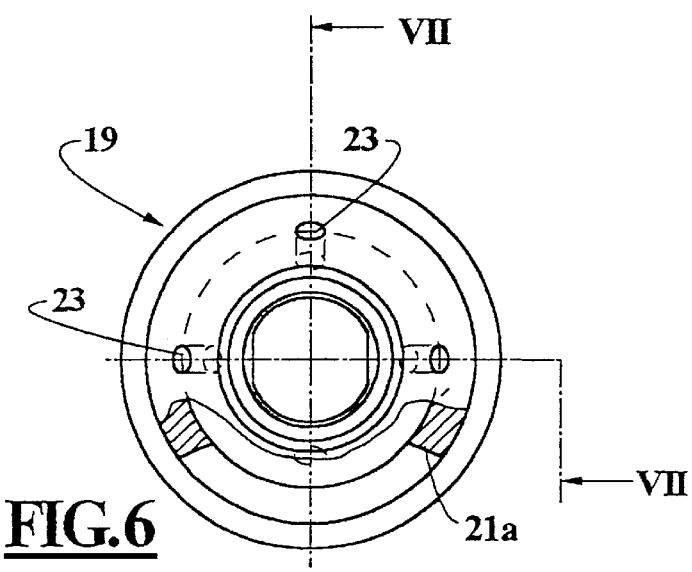
FIG. 6 shows the stop valve according to FIG. 5 in cross section.
Figure 7:
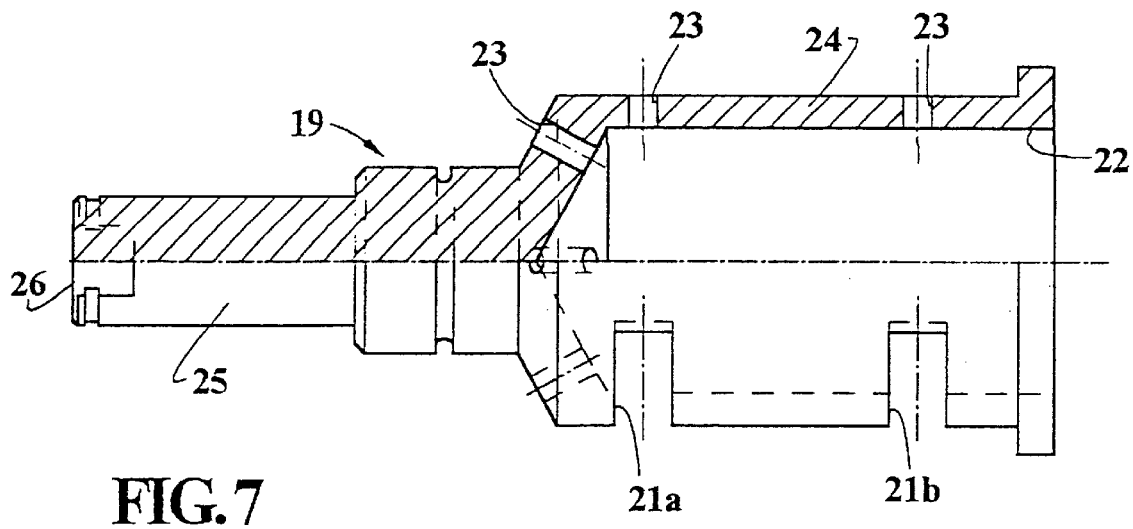
FIG. 7 is a view, partially in section, of the stop valve along the line VII—VII of FIG. 6.

FIGS. 5 to 7 show the rotary body 19 of the stop valve in detail. The rotary body 19 has a hollow-cylindrical basic section 24 and an adjoining solid cylindrical section 25 having a smaller diameter and a free end face 26 which is engaged by the actuating device for controlling the position of the stop valve. As it is apparent in particular from FIG. 6, the slot-shaped flow orifices 21a, 21b extend over an angular section of between 90° and 180°, preferably about 120°, along the circumference of the basic section 24 of the rotary body 19. The slot-shaped flow orifices 21a, 21b are parallel to one another, and the beginnings and endings of the slots are at the circumferential locations. The flow orifices extend radially to the interior of the rotary body. Exhaust gas, which has entered, can be discharged from the interior via the axial flow orifice 22 in one end face of the basic section 24.

Equalizing bores 23 are provided in the region of the basic section 24, for equalizing pressure in the sleeve receiving the rotary body 19 so as to prevent the rotary body from being jammed by being exposed only to an internal pressure. The equalizing bores are oriented radially in the cylindrical casing of the basic section 24 and partly axially in the region of transition to the solid cylindrical section 25.

The engine-braking device may also be used when the engine is in a power output mode in order to reduce the intake pressure. In this case, the engine-braking device performs the function of controlling the turbine power output.

If a turbine with variably adjustable turbine geometry, for example with a displaceable guide baffle, is used, the brake valve in the exhaust duct is not needed. In this case, the exhaust-gas backpressure can be increased during braking by moving the guide baffle into the flow path section of the turbine. In this case, the guide baffles are substituted for the brake valve. In this design, too, the discharge arrangement may be used as overload protection and/or for regulating the braking capacity or the engine power.

With the aid of the discharge arrangement, a cruise control function can also be implemented, wherein a predetermined speed is to be maintained, particularly during downhill operation. The discharge quantity can be controlled by the actuator of the discharge arrangement with the aid of a controller. The device can be controlled over a wide braking range via the blow-off quantity, since the braking capacity may be varied purely by controlling the amount of air blown off upstream of the turbine. The blow-off quantity is controlled by actuating signals from a control device, which may additionally control the setting of the engine power output, so that a constant speed can be maintained under all operating conditions.

What is claimed is:

1. An engine braking arrangement for an internal combustion engine having intake and exhaust ducts with an exhaust gas turbocharger including a turbine with a rotor disposed in the exhaust duct so as to be driven by the exhaust gas generated by the internal combustion engine and, arranged in said intake duct, a compressor driven by said turbine, a brake valve disposed in said exhaust duct upstream of said turbine and being adjustable between open and closed positions and a pressure relief line extending from an area of said exhaust duct upstream of said turbine rotor and including a stop valve for opening or closing said pressure relief line, said stop valve being a rotationally adjustable rotary valve which is operable by an actuating device connected to said rotary valve for controlling said rotary valve depending on the intake pressure in said intake duct.

2. The engine braking arrangement according to claim 1, wherein said relief line extends around said brake valve.

3. The engine braking arrangement according to claim 2, wherein said relief line is integrated into said brake valve.

4. The engine braking arrangement according to claim 3, wherein said brake valve is a rotary valve having a valve body rotating with a shaft and said relief line includes a passage extending through said shaft.

5. The engine braking arrangement according to claim 4, wherein said rotary valve is arranged in said exhaust duct within the shaft of said brake valve and the axis of rotation of said rotary valve is orthogonal to the axis of rotation of the brake valve.

6. The engine braking arrangement according to claim 2, wherein said relief line is an independent line extending outside the exhaust line.

7. The engine braking arrangement according to claim 6, wherein said relief line extends to, and joins, said exhaust line downstream of the brake valve and upstream of the turbine.

8. The engine braking arrangement according to claim 6, wherein said relief line extends to, and joins, the exhaust line downstream of the turbine.

9. The engine braking arrangement according to claim 1, wherein said relief line extends from said exhaust duct downstream of said brake valve and joins said exhaust line downstream of the turbine.

10. The engine braking arrangement according to claim 9, wherein said relief line branches off a supply duct in the casing of said turbine.

11. The engine braking arrangement according to claim 1, wherein said rotary valve has a hollow cylindrical rotary body.

12. The engine braking arrangement according to claim 11, wherein said rotary body has radial flow orifices.

13. The engine braking arrangement according to claim 12, wherein said flow orifices are slots extending over a portion of the circumference of the rotary body.

14. The engine braking arrangement according to claim 13, wherein said flow slots extend over an angle of at least 90° over the circumference of said rotary body.

15. The engine braking arrangement according to claim 13, wherein said flow slots extend over an angle of at most 180° over the circumference of the rotary body.

16. The engine braking arrangement according to claim 11, wherein said rotary body has an axial flow orifice.

17. The engine braking arrangement according to claim 11, wherein said rotary body includes pressure-equalizing bores.

18. The engine braking arrangement according to claim 1, wherein said actuating device of said rotary valve is a pressure bellows which is connected to said rotary valve so that said rotary valve is operable by the pressure in said intake duct and forms the actuating pressure for said pressure bellows.

* * * * *